United States Patent

Böldt

Patent Number: 5,723,847
Date of Patent: Mar. 3, 1998

[54] METHOD FOR DETERMINING AND DISPLAYING THE REMAINING TIME IN A TREATMENT PROGRAM IN A HOUSEHOLD APPLIANCE AND ELECTRONIC CONTROL UNIT FOR PERFORMING THE METHOD

[75] Inventor: Frank Böldt, Berlin, Germany

[73] Assignee: Bosch-Siemens Hausgeraete GmbH, Munich, Germany

[21] Appl. No.: 693,455

[22] Filed: Aug. 7, 1996

[30] Foreign Application Priority Data

Aug. 7, 1995 [DE] Germany ............... 195 28 980.3

[51] Int. Cl.$^6$ ............................................. H05B 1/02
[52] U.S. Cl. ............... 219/506; 219/497; 219/492; 219/481; 99/325; 374/103
[58] Field of Search ............... 219/492, 493, 219/497, 501, 506, 508, 483–486, 481; 99/325, 330, 331; 374/101–103

[56] References Cited

U.S. PATENT DOCUMENTS

| | | |
|---|---|---|
| 4,407,587 | 10/1983 | Fujita ............................... 368/108 |
| 4,410,794 | 10/1983 | Williams ........................... 219/486 |
| 5,378,874 | 1/1995 | Holling et al. ................... 219/506 |
| 5,398,597 | 3/1995 | Jones et al. ....................... 99/330 |

*Primary Examiner*—Mark H. Paschall
*Attorney, Agent, or Firm*—Herbert L. Lerner; Laurence A. Greenberg

[57] ABSTRACT

A method and an electronic control unit for determining and optionally displaying the remaining time in a treatment program in a household appliance include superposing an initializing test program segment on the treatment programs in order to determine an "installed heating capacity" parameter that determines a gradient. To that end, a defined quantity of the medium is heated with an electrical heater for a predetermined period of time. The "installed heating capacity" parameter and/or a comparison value corresponding to its magnitude is calculated from the attained temperature increase, the defined quantity of the medium and the known period of time and is stored as an operand in a nonvolatile memory for later remaining-time determinations.

3 Claims, 2 Drawing Sheets

5,723,847

METHOD FOR DETERMINING AND DISPLAYING THE REMAINING TIME IN A TREATMENT PROGRAM IN A HOUSEHOLD APPLIANCE AND ELECTRONIC CONTROL UNIT FOR PERFORMING THE METHOD

BACKGROUND OF THE INVENTION

FIELD OF THE INVENTION

The invention relates to a method for determining and optionally displaying the remaining time in a treatment program in a household appliance having an electric heater for heating a medium used for the treatment, which includes constantly monitoring the temperature of the medium on the basis of a time estimate based on a temperature gradient of the medium through a heating time segment. The invention also relates to an electronic control unit for performing the method.

One such method is known from German Published, Non-prosecuted Patent Application DE 37 03 671 A1. In that reference, the novelty is that the electric heater has an output capacity which corresponds to its rated capacity. Given the many variant types of heating bodies, considerable fluctuations can occur both in the rated capacity and in the actual output capacity, they have a major influence on the temperature gradient and through the temperature gradient essentially enter into the magnitude of the calculated remaining time.

SUMMARY OF THE INVENTION

It is accordingly an object of the invention to provide a method for determining and displaying the remaining time in a treatment program in a household appliance and an electronic control unit for performing the method, which overcome the hereinafore-mentioned disadvantages of the heretofore-known methods and devices of this general type and in which variations in an output heating capacity of an installed electric heating body are automatically detected and taken into account as an operand for later determinations of remaining time.

With the foregoing and other objects in view there is provided, in accordance with the invention, a method for determining and optionally displaying the remaining time in a treatment program in a household appliance, which comprises equipping the household appliance with an electric heater to heat a medium used for treatment; constantly monitoring the temperature of the medium on the basis of a time estimate based on a temperature gradient of the medium through a heating time segment; superposing or connecting on the line side an initializing test program segment to determine an "installed heating capacity" parameter that determines the gradient; heating a defined quantity of the medium with the electrical heater for a predetermined period of time for the segment; calculating the "installed heating capacity" parameter and/or a comparison value corresponding to its magnitude from the attained temperature increase, the defined quantity of the medium and the known period of time; and storing the "installed heating capacity" parameter and/or a comparison value corresponding to its magnitude as an operand in a nonvolatile memory for later remaining-time determinations.

When the invention is employed, different variations in equipment of electrical heaters with respect to their power output can be detected automatically. Moreover, misconnections of individual heating bodies that occur from errors in assembly are automatically detectable, for instance if a series circuit of heating bodies has been created instead of a parallel circuit.

In accordance with another mode of the invention, the test program segment can be called up from outside the household appliance.

According to a feature of the invention, test program segments of the type according to the invention can then be adjusted, at an arbitrary time after shipment of the household appliance from the factory, to an actual heating capacity that has changed in the mean time. For instance, a heating rod with a power output other than the mass-production status can be installed at the wish of the customer. This new "installed heating capacity" can subsequently be used as an operand, stored in the nonvolatile memory, by callup of the test program segment, for later determinations of remaining time. Subsequent remaining-time determinations then remain sufficiently accurate as well.

With the objects of the invention in view there is also provided, in a household appliance having an electric heater for heating a medium required for a process to be performed by the household appliance, and at least one temperature sensor for the/medium, an electronic control unit connected to the at least one temperature sensor for determining and optionally displaying the remaining time in a treatment program in the household appliance, comprising a memory for storing a test program for testing at least one function of the household appliance and for calling up the test program for applying one signal upon turning on the heater and applying a further signal from the temperature sensor; and a time base circuit to be started when the test program is called up and/or the heater is turned on, for receiving signals about the turn-on of the heater and from the temperature sensor once again at a predetermined time mark and for comparing them with applicable signals when the test program was called up and/or the heater was turned on.

Other features which are considered as characteristic for the invention are set forth in the appended claims.

Although the invention is illustrated and described herein as embodied in a method for determining and displaying the remaining time in a treatment program in a household appliance and an electronic control unit for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the embodiments of the invention in detail, it is noted that special test programs which automatically test the function of a heater and other machine functions at the end of a manufacturing process are known to be already installed in electronic control units of household appliances. Such a test program finds that the heater is functioning properly if the water that has been fed in has been heated by the amount of a certain temperature difference, such as $\Delta\theta=3°$ C., within a predetermined time frame. The time frame is selected in such a way that at the desired heating the required temperature difference is still attained with a heating capacity that is the least of a number of heating bodies to be compared.

Figure 1:
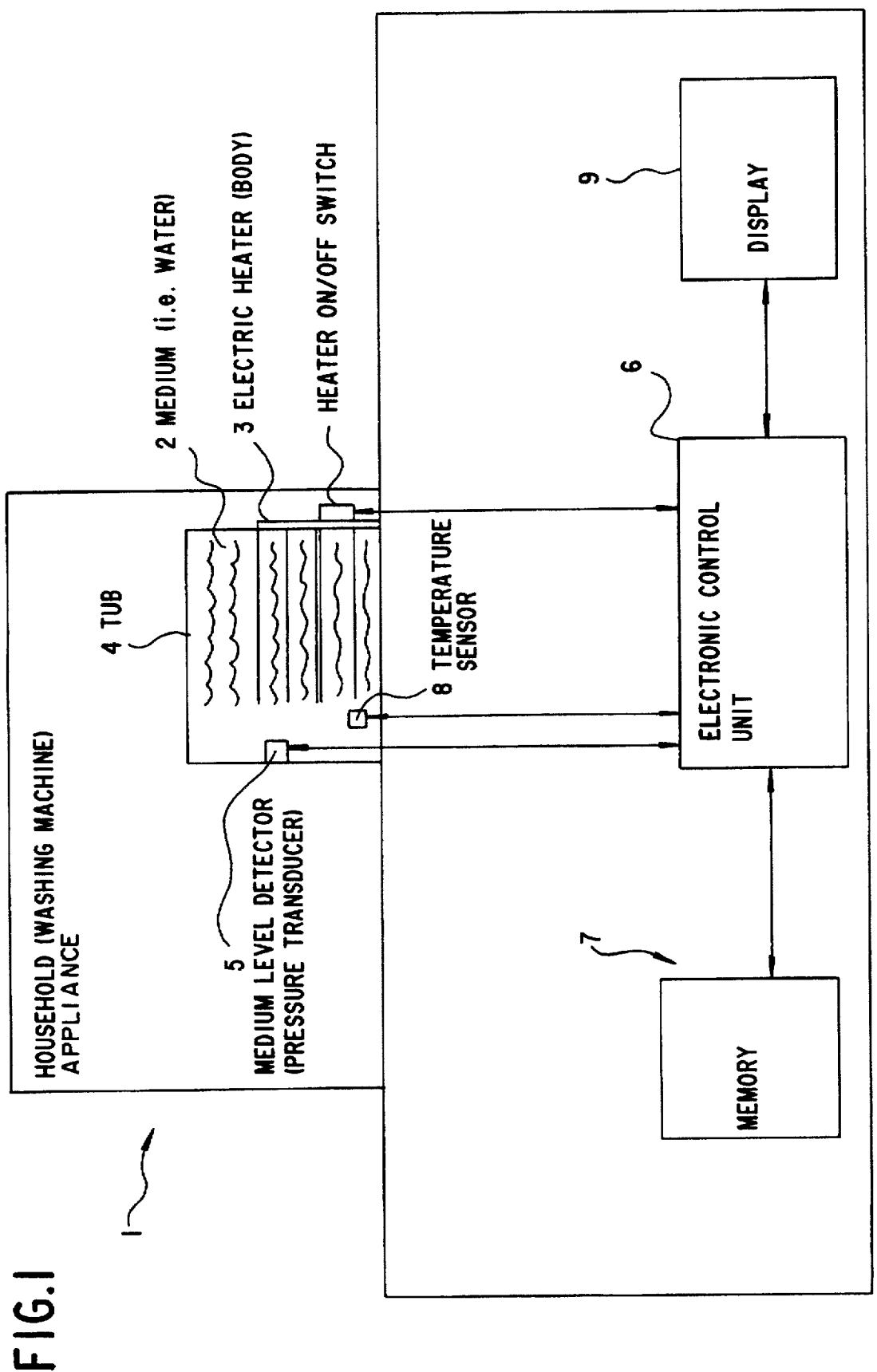
FIG. 1 is a block diagram of an appliance and its related control system.

In order to now be able to calculate the remaining time as accurately as possible in a method for determining and optionally displaying the remaining program time still to be run through in a household appliance 1 as shown in FIG. 1, on one hand the duration of the heating phase must be taken into account. This heating phase depends on one hand on the predetermined temperature difference and on the other hand on the initial temperature of the medium 2 to be heated. Until now, in such methods for determining the remaining time, the assumption has been that the heating capacity of the installed heating body matches the rated capacity of the heating body 3. Significant errors have occurred as a result.

When the method of the invention is used in a washing machine, a defined amount of water is introduced into the tub 4, which may always be the amount of water that is needed until the first switching level of a pressure transducer 5 is reached, so that in this regard the same starting conditions always pertain. The length of time within which the defined quantity of water is heated by the amount of $\Delta\theta=n°$ C. (for instance, n=3) is ascertained by using a microcontroller of a control unit 6 and a temperature sensor 8. A higher-capacity heating body heats the defined amount of water in a shorter time than a lower-capacity heating body. The temperature gradient which is ascertained, and/or a comparison value corresponding to the "installed heating capacity" variable, is stored in the nonvolatile memory of the microcontroller and taken into account in later calculations of the remaining time in each washing program being selected or called up.

The method of the invention has the advantage of permitting different equipment versions of heating bodies to be automatically detected, and corresponding comparison values to be stored in the nonvolatile memory for later calculations of whatever type, in which the heating capacity plays a determining role. Misconnections, for instance of a plurality of heating bodies distributed within the household appliance, can also be automatically detected by a test program of the invention. The test program can be configured in such a way that it trips an error report if the "installed heating capacity" being detected deviates from a bandwidth which is defined by all possible correct variations in equipment, while taking their tolerances into account. For instance, a misconnection can occur from a series connection of two heating bodies that should properly have been installed as a parallel circuit. The "installed heating capacity" that is then detected, which is one-fourth the rated value of the parallel circuit, would trip an immediate error report on the part of the test program and the error would be shown on a display 9. Later changes in the "installed heating capacity" could readily be taken into account by ensuring that the test program segment can be called up from the outside of the household appliance, for instance by entering a certain order of input treatments that match none of the intended program input treatments. Such a change in the "installed heating capacity" can occur if the heating bodies are changed, or as a result of aging of the heating bodies. If over the course of the service life of a household appliance the customer should find that the calculated, displayed remaining time differs from actual conditions, unlike when the household appliance was new, then an adaptation to the altered heating capacity conditions could be made by calling up the test program segment once again.

Figure 2:
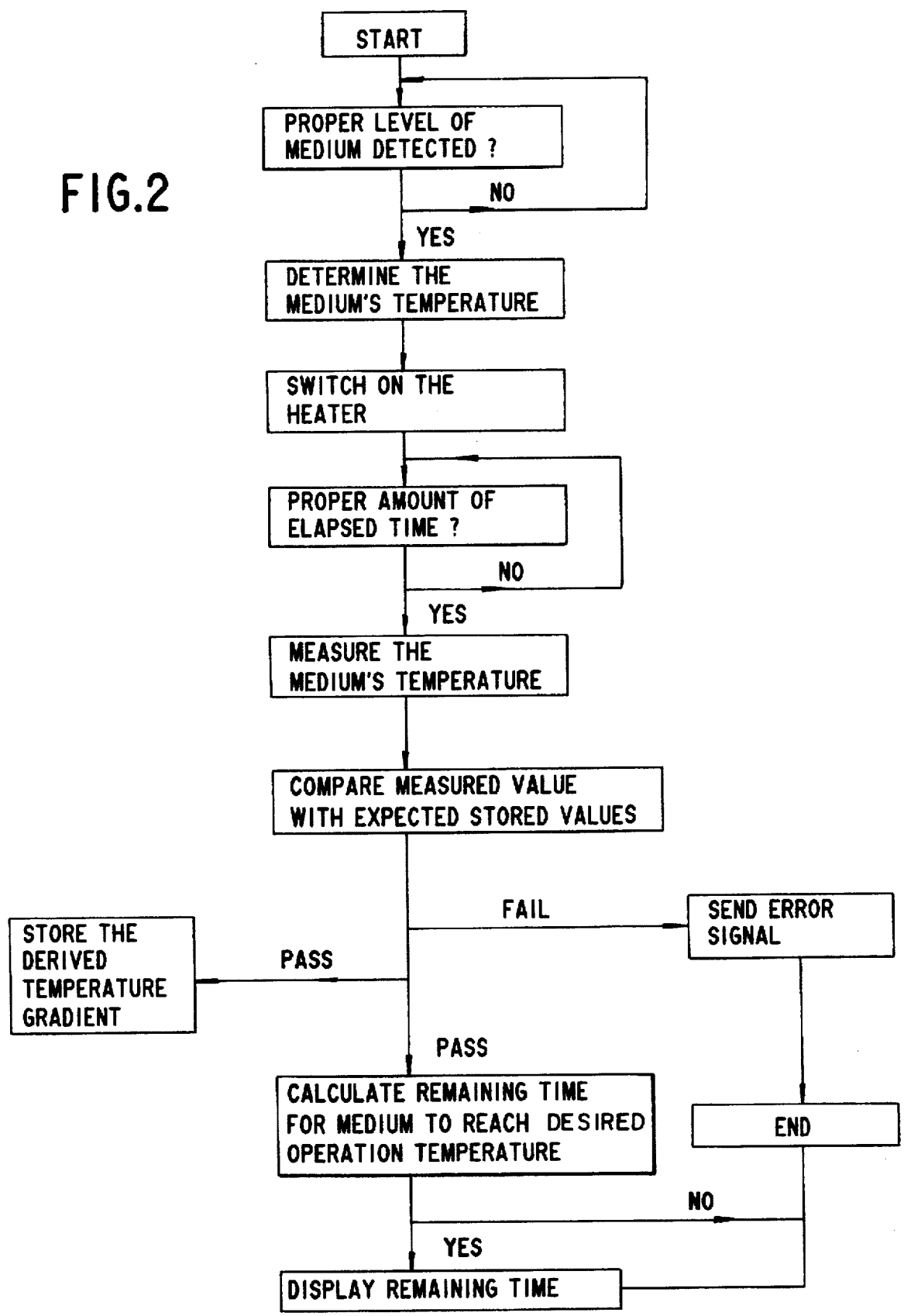
FIG. 2 is a flow chart depicting the operation of the appliance and the control system.

FIG. 2 is a flow chart depicting the operation of the appliance and the control system.

I claim:

1. A method for determining and optionally displaying the remaining time in a treatment program in a household appliance on the basis of a time estimate based on a temperature gradient of a medium through a heating time segment, which comprises:

equipping the household appliance with an electric heater to heat a medium used for treatment and constantly monitoring a temperature of the medium;

initializing a test program segment to determine an installed heating capacity parameter that determines a temperature gradient of the medium;

heating a defined quantity of the medium with the electrical heater for a predetermined period of time;

calculating at least one of the installed heating capacity parameter and a comparison value corresponding to its magnitude from the attained temperature increase, the defined quantity of the medium and the known period of time; and storing at least one of the installed heating capacity parameter and a comparison value corresponding to its magnitude as an operand in a nonvolatile memory to be use for calculating the time remaining in the treatment program.

2. The method according to claim 1, which comprises calling up the test program segment from outside the household appliance.

3. In a household appliance having an electric heater for heating a medium required for a process to be performed by the household appliance, and at least one temperature sensor for the medium, an electronic control unit connected to the at least one temperature sensor for determining and optionally displaying the remaining time in a treatment program in the household appliance, comprising:

a memory for storing a test program for testing at least one function of the household appliance and for calling up the test program for applying one signal upon turning on the heater and applying a further signal from the temperature sensor; and a time base circuit to be started upon at least one of calling up the test program and turning on the heater, for receiving signals about the turn-on of the heater and from the temperature sensor once again at a predetermined time mark and for comparing them with applicable signals upon at least one of calling up the test program and turning on the heater.

* * * * *